UNITED STATES PATENT OFFICE.

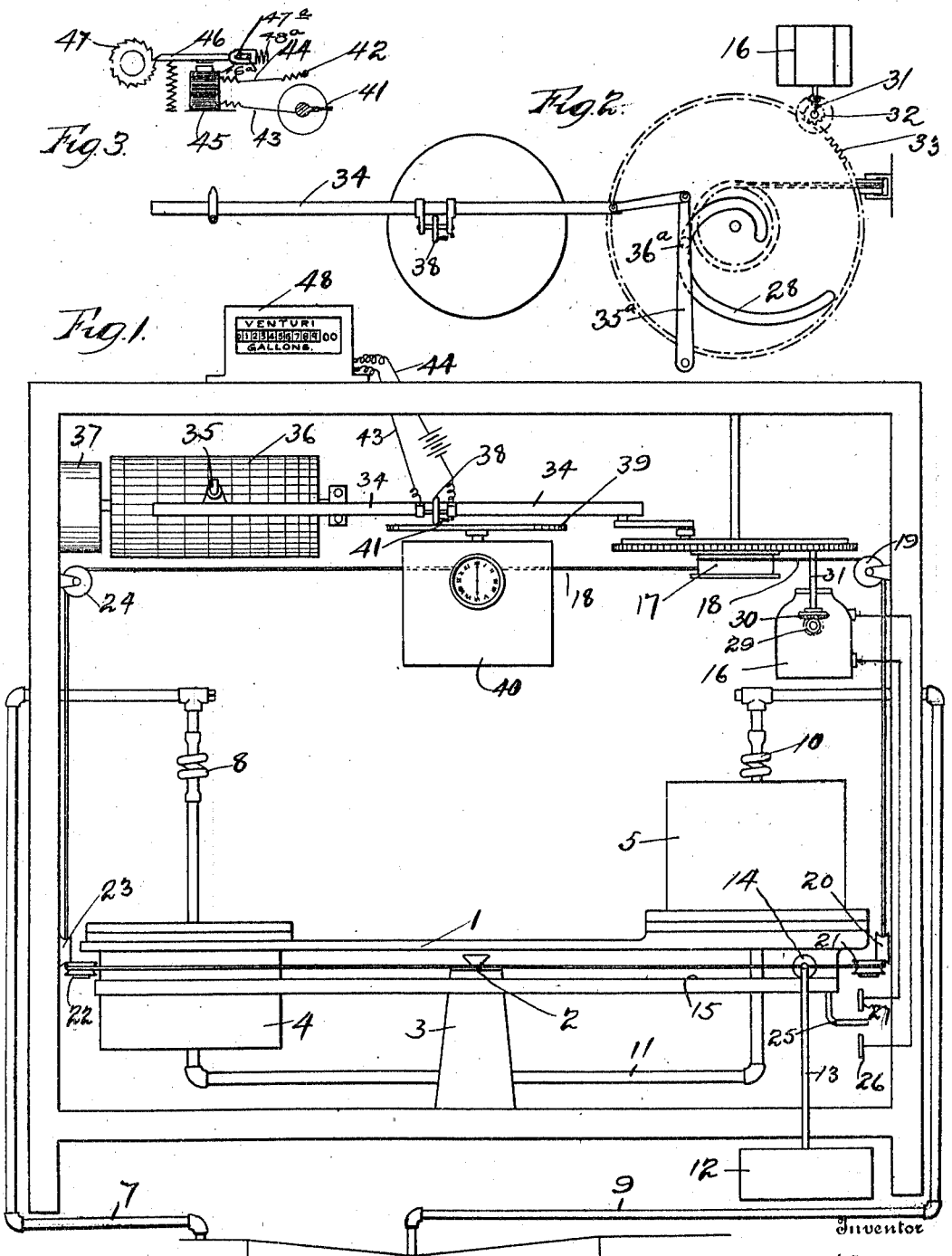
F. N. CONNET.
INTEGRATING AND RECORDING APPARATUS FOR METERS.
APPLICATION FILED JUNE 5, 1907.
1,059,277.
Patented Apr. 15, 1913.

FREDERICK N. CONNET, OF PROVIDENCE, RHODE ISLAND, ASSIGNOR TO BUILDERS IRON FOUNDRY, OF PROVIDENCE, RHODE ISLAND.

INTEGRATING AND RECORDING APPARATUS FOR METERS.

1,059,277.

Specification of Letters Patent.   Patented Apr. 15, 1913.

Application filed June 5, 1907.   Serial No. 377,476.

*To all whom it may concern:*

Be it known that I, FREDERICK N. CONNET, a citizen of the United States, residing at the city of Providence, in the county of Providence and State of Rhode Island, have invented certain new and useful Improvements in Integrating and Recording Apparatus for Meters, of which the following is a specification, reference being had therein to the accompanying drawing.

This invention relates to integrating and recording apparatus for meters, and has for its object to provide an apparatus of simple and practical construction that will automatically give the sum and total in gallons, cubic feet, or other convenient unit of measure of the quantity of liquids or gases passing through a given aperture, and at the same time record the variation of the flow so that the quantity that has passed through during any period may be readily ascertained.

The apparatus is particularly adapted to register the flow through a pipe or tube similar in construction to that commonly known as the Venturi tube described in the United States Patent No. 281,373, dated April 17, 1888, and the registering and recording devices are arranged to be actuated by an electric motor, or other power generating means which is controlled in its action indirectly by the difference between the pressures at two points in said tube.

In carrying out my invention two receptacles are employed the same being connected together and arranged to contain a body of liquid (usually mercury) of greater specific gravity than the liquid to be measured, both of said receptacles being supported upon a scale beam and the contents in each is caused to vary in weight as more or less of the heavy liquid is forced from one to the other, the quantity being proportional to the velocity through the tube. The varying weight of the different receptacles is compensated for by a proportional movement of the counterbalance on the scale beam.

When one receptacle is heavier than the other the beam is tipped and caused to form an electric connection whereby a motor is energized to actuate the registering and recording devices an amount in proportion to the period of contact, the period being pro-
longed until the motor shall have moved the weight on the beam a distance necessary to perfectly balance the weight in the receptacle, whereby the beam will be moved to break the circuit and prevent a further operation of the motor until a connection is made again by a change of weight in the receptacles.

It is found in practice that the life of flexible connections, such as rubber tubes and the like, is very short when subjected to the action of mercury, and this difficulty has been overcome in my present construction by placing the flexible connections above the receptacle where they serve to conduct the water and are not brought into contact with the mercury.

The invention is fully set forth in this specification and more particularly pointed out in the appended claims.

In the accompanying drawings: Figure 1— is a diagrammatic view illustrating a simple construction which embodies the features of my present invention. Fig. 2— is a top or plan view showing the compensating cam and its connection to the integrating and recording devices. Fig. 3— is a small detail showing a simple form of mechanism whereby the completing of an electric circuit will actuate the integrating device to register the flow through the supply pipe.

Referring to the drawings 1 is a scale beam balanced or pivoted at 2 on the knife edge, which rests on the support 3. The vessels 4 and 5 are supported at either end of the scale beam, the inner side of the bottom of vessel 5 being on a line with the inner side of the top of vessel 4 when the beam is in its normal or level position, the vertical positions of these vessels being changed temporarily by a change in the velocity of the flow through the tubes whereby a portion of the contents of one vessel is forced into the other.

My device may be connected to the main supply pipe and operated by the flow through the same, said pipe being provided with a contracted or neck portion 6, the flow being through the same in the direction of the arrow. The vessel 4 is connected through its top to the up-stream side of the main supply through the small pipe 7 and the short section of flexible tubing 8, while the vessel 5 on the opposite end of the scale beam is connected at its upper end to the contracted portion 6 in the main supply through the pipe 9 and the short section of flexible tubing 10. These two vessels are connected together through their lower ends by means of the pipe 11.

At 12 is a weight which is suspended by the rod 13 from the wheel 14, said wheel being adapted to be rolled along the track 15 on said scale beam, to counterbalance the change in weight of the contents from one vessel to the other. In order to move this counterweight automatically along the beam I have provided an electric motor 16 which is arranged to actuate the drum 17, around which is wound the cord 18. This cord is led over the pulleys 19, 20 and 21 and connected to said wheel 14 and then continued around over the pulleys 22, 23 and 24 back to the said drum 17 whereby a movement of said drum in either direction moves the weight a proportional distance along the scale beam. A contact finger 25 is arranged on the scale beam so that when one end of the beam is down said finger makes a connection to the terminal 26 to complete the circuit to said motor, causing it to run in one direction so long as this contact continues. When this end of the beam is raised a sufficient distance a connection is made through the terminal 27 whereby the motor is caused to run in the opposite direction, and when the beam is perfectly balanced the contact finger stands in the center between the terminals and the action of the motor ceases.

The mechanism above described is caused to move in proportion to the rate of flow through the main supply, and means have been provided to accurately indicate and record the rate and quantity, which means are operated as follows:—The rotation of the motor 16 is transmitted to the cam 28 through the gears 29 and 30, short shaft 31 and gears 32 and 33, and through this cam a reciprocating motion is given to the bar 34 through the lever 35ª on which lever is fixed the contact in 36ª which engages said cam. Mounted on this bar is the recording pen 35 which is moved longitudinally along the face of the record sheet 36. This record sheet is mounted on a drum and is adapted to be continuously rotated by means of the clock mechanism (not shown), in the casing 37. The horizontal lines on the face of this chart denote the twenty-four hours of the day, while the circumferential lines represent gallons or any other convenient unit of measure whereby the amount of flow passing through the pipe is continuously recorded by the tracing of the pen, so that the quantity, whether constant or varying, that has passed through at any period may be readily ascertained. Also mounted on this reciprocating bar 34 is a contact wheel 38, which wheel is adapted to be moved laterally over the face of the disk 39 toward and from the center of the same. This disk 39 is caused to be continuously rotated by means of the clock mechanism (not shown) in the casing 40. Mounted to rotate with this wheel 38 is a contact pin 41 which is adapted to make a connection with the terminal 42 at each revolution of the wheel to complete the connection through the wires 43 and 44 to the magnet 45, shown in Fig. 3, whereby at each revolution of this wheel the magnet will be energized to draw the pawl 46 downward and rotate the ratchet wheel 47 one tooth at a time, whereby the train of gearing, not shown, will be actuated to operate the register 48. The pivoted end of this pawl 46 is slotted as at 46ª so as to have a slight endwise motion on pin 47ª and is pressed forward by spring 48ª so as to engage the next adjacent tooth after completing a downward stroke.

In the ordinary construction of apparatus of this character flexible tubes, either rubber, brass, copper, or the like, have been employed to conduct the mercury from one chamber to the other. One disadvantage of this construction is that the mercury coming in contact with this flexible tubing attacks and soon destroys the same, causing the annoyance of being obliged to replace the connections frequently. An essential feature of my improved apparatus is the balancing of both of these vessels on a scale beam one on either side of its pivoting point, and forcing the heavy liquid from one vessel to the other through a rigid connection whereby the over-balancing of the beam either on one side or the other is caused to operate means, either electrical or otherwise, to integrate, record, or indicate the rate or quantity of flow through the main. By this construction the flexible connections to these vessels are through the top of the same and are used only for conducting the water thereto, thus effectually removing said connections from the deteriorating action of the mercury.

The operation of the apparatus may be more fully described as follows: The vessels 4 and 5 jointly contain a body of fluid, (preferably mercury), of greater specific gravity than the fluid to be measured. When there is no flow through the main the pressure at all points in the pipe is of course equal and the mercury, seeking its own level, passes into the receptacle 4 filling the same even with the bottom of the receptacle 5, the counter-weight being drawn to the opposite end of the beam to balance the weight of fluid in the first receptacle. As soon as the flow through the main begins the pressure at the throat 6 is decreased and becomes less than that at a point above said throat where the pipe 7 is connected, therefore a portion of the mercury corresponding to the difference in the pressures at these two points, is forced from vessel 4 out through the pipe 11 into the vessel 5. The heavy fluid being transferred from one end of the scale beam to the other naturally carries downward the heavy end causing the finger 25 to contact with the terminal 26 and complete the circuit to energize the motor and cause the weight 12 to move along the scale beam and balance the weight of the fluid in the vessel 5. The operation of the motor at the same time moves the recording pen over the face of the record sheet to indicate the rate of flow and also carries the contact wheel outward from the center of its driving disk causing the integrating mechanism to operate. As soon as the flow decreases a reverse action takes place, a portion of the mercury is forced back from the vessel 5 into the vessel 4, the scale beam on the right end rising making a contact with finger 27 causing a reverse action of the motor to move the counterweight to the right to balance the weight in the opposite vessel and return the scale beam to its central or normal position.

This device is very practical in its operation and by its use an accurate reading of the rate of flow and the quantity that has passed through the tube may be readily obtained.

Having thus described my invention, what I claim as new and desire to secure by Letters Patent, is:

1. In an apparatus of the character described, the combination of a conductor pipe, a scale beam, two vessels containing liquid of greater specific gravity than the fluid to be measured, the same being supported by said beam one on either side of its balancing point, a connection between said vessels, means whereby a change in the flow through said conductor will automatically change the relative weights of the contents of said vessels, a counterweight on said beam, means whereby said counterweight is automatically moved along said beam to accurately compensate for any such change in the relative weights of the contents of said vessels, an integrating mechanism and means whereby said mechanism is operated at a speed in proportion to the distance of said counterbalance from its zero or starting position.

2. In an apparatus of the character described, the combination of a conductor pipe, a scale beam, two vessels containing liquid of greater specific gravity than that to be measured the same being supported by said beam one on either side of its pivoting point, a connection between said vessels, means whereby a change in the flow through said pipe will automatically change the relative weights of the contents of said vessels, a counterweight on said beam, a motor controlled by the position of said beam whereby said weight is caused to be moved along said beam to automatically compensate for any such change in the relative weights of the contents of said vessels, and an integrating mechanism controlled by the action of said motor.

3. In an apparatus of the character described, the combination of a conductor pipe, a scale beam, two vessels supported on said beam one on each side of its balancing point, a connection between said vessels, said vessels jointly containing a body of liquid of greater specific gravity than that of the fluid to be measured, means whereby the differential pressure in said pipe of the fluid to be measured causes a proportional flow of said heavy liquid from one vessel to the other, means for automatically compensating for any change in the relative weights of the contents of said vessels, an integrating mechanism, and means whereby said counterbalancing means is caused to operate said integrating mechanism in proportion to the quantity of liquid forced from one vessel to the other.

4. In an apparatus of the character described, the combination of a conductor pipe, a scale beam, two vessels supported on said beam one on each side of its balancing point, a connection between said vessels, said vessels jointly containing a body of liquid of greater specific gravity than that of the fluid to be measured, means whereby differential pressure in said pipe of the fluid to be measured causes a proportional flow of said heavy liquid from one vessel to the other, a counterbalance on said beam, a motor controlled in its action by the position of said beam, means whereby said counterbalance is moved by said motor to compensate for the changing in the relative weights of the contents of said vessels, and cam actuated means controlled by the longitudinal movement of said weight for indicating the rate of flow through said pipe.

5. In an apparatus of the character described, the combination of a conductor pipe, a scale beam, two vessels supported on said beam one on each side of its balancing point, a connection between said vessels, said vessels jointly containing a body of liquid of greater specific gravity than that of the fluid to be measured, means whereby the differential pressure in said pipe of the fluid to be measured causes a proportional flow of said heavy liquid from one vessel to the other, a flexible tube connected to the upper portion of each vessel for conducting only the fluid to be measured, a motor, motor actuated means for automatically compensating for any change in the relative weights of the contents of the vessels, an integrating mechanism, and a cam moved by the action of said motor whereby said integrating mechanism may be controlled.

In testimony whereof I affix my signature in presence of two witnesses.

FREDERICK N. CONNET.

Witnesses:
CHARLES G. RICHARDSON,
HOWARD E. BARLOW.